(12) United States Patent
Yin et al.

(10) Patent No.: US 9,160,669 B2
(45) Date of Patent: Oct. 13, 2015

(54) METHOD AND DEVICE FOR LEAKY BUCKET SPEED-LIMITATION

(75) Inventors: Junjie Yin, Shenzhen (CN); Yi Liu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 81 days.

(21) Appl. No.: 14/127,862

(22) PCT Filed: Jun. 28, 2011

(86) PCT No.: PCT/CN2011/076465
§ 371 (c)(1),
(2), (4) Date: Jan. 15, 2014

(87) PCT Pub. No.: WO2013/000116
PCT Pub. Date: Jan. 3, 2013

(65) Prior Publication Data
US 2014/0119190 A1  May 1, 2014

(51) Int. Cl.
*H04L 1/00* (2006.01)
*H04L 12/819* (2013.01)

(52) U.S. Cl.
CPC .............. *H04L 47/215* (2013.01); *H04L 47/21* (2013.01)

(58) Field of Classification Search
None
See application file for complete search history.

(56) References Cited

U.S. PATENT DOCUMENTS 7,173,908 B2 *  2/2007  Davis et al. ................ 370/235.1
7,719,968 B2 *  5/2010  Swenson et al. .............. 370/229
7,826,358 B2   11/2010  Caram
(Continued)

FOREIGN PATENT DOCUMENTS

CN           1859206 A       11/2006
CN         101425974 A        5/2009
(Continued)

OTHER PUBLICATIONS

Benjapolakul et al, Priority Leaky Buckets with Extra Token Pool for Policing Traffic in ATM Networks, IEEE, 6 pages, 2001.*
(Continued)

*Primary Examiner* — Frank Duong
(74) *Attorney, Agent, or Firm* — Neifeld IP Law, PC

(57) ABSTRACT

The disclosure discloses a method for traffic limitation by a leaky bucket, including that: during traffic-limitation of a group of packets sharing a same leaky bucket and having separate weighted priorities, the overall leaky bucket is divided into multiple sub-buckets according to priority parameters of the packets including a number of the weighted priorities and ratios between the weighted priorities; after packet information is received, parameters relevant to traffic-limitation by a leaky bucket is acquired; a total number of tokens to be added to the overall leaky bucket is calculated; token-addition is performed on the sub-buckets according to a state of the overall leaky bucket after addition of the total number of tokens and the weighted priorities corresponding to the sub-buckets; a packet is forwarded, or discarded, or marked according to a length of the packet and a number of tokens in a sub-bucket corresponding to a weighted priority, wherein in performing token-addition on the sub-buckets, after token-addition is performed on all the sub-buckets, any overrunning token is allocated to another sub-bucket not overrun with tokens. The disclosure further discloses a device for traffic limitation by a leaky bucket. With the disclosure, it is possible to limit packet traffic flexibly according to weighted priorities and improve resource utilization.

22 Claims, 4 Drawing Sheets

(56) References Cited

U.S. PATENT DOCUMENTS

| | | | |
|---|---|---|---|
| 8,467,296 B2 * | 6/2013 | Figueira | 370/235.1 |
| 2006/0187827 A1 | 8/2006 | Smith | |
| 2006/0203721 A1 | 9/2006 | Hsieh | |
| 2008/0159135 A1 | 7/2008 | Caram | |
| 2010/0202295 A1 | 8/2010 | Smith | |

FOREIGN PATENT DOCUMENTS

| | | |
|---|---|---|
| CN | 101478491 A | 7/2009 |
| CN | 101848167 A | 9/2010 |
| EP | 1694004 A1 | 8/2006 |
| WO | 2008082599 A1 | 7/2008 |

OTHER PUBLICATIONS

English Translation of the Written Opinion of the International Search Authority in international application No. PCT/CN2011/076465, mailed on Apr. 5, 2012.

International Search Report in international application No. PCT/CN2011/076465, mailed on Apr. 5, 2012.

Supplementary European Search Report in European application number: 11868792.0, mailed on Feb. 17, 2015.

* cited by examiner

METHOD AND DEVICE FOR LEAKY BUCKET SPEED-LIMITATION

CROSS REFERENCE TO RELATED APPLICATIONS

This application is a national stage entry of PCT/CN2011/076465, filed Jun. 28, 2011, which published as WO 2013/000116 in a language other than English on Jan. 3, 2013.

TECHNICAL FIELD

The disclosure relates to the field of data networks, and in particular to a method and device for traffic limitation by a leaky bucket.

BACKGROUND

In an existing data network, a burst of packet traffic often leads to network congestion. To avoid such network congestion and improve the Quality of Traffic (QoS) of the data network, the packet traffic needs to be limited at a receiver. If the rate of a packet is lower than a specified rate, the packet is received normally. If the rate of the packet exceeds the specified rate, the packet is discarded or marked.

With a method widely adopted at present, the packet traffic is limited by a leaky bucket, and common leaky-bucket-based standards include RFC(Request for Comments) 2697 and RFC2698, i.e. single-rate three-color dual buckets and two-rate three-color dual buckets. FIG. 1 shows the principle of traffic limitation by a leaky bucket in an RFC standard, which specifically includes that: tokens are filled into a leaky bucket continuously according to a specified rate until the leaky bucket is overrrun. When a packet arrives, the length of the packet is compared with the number of tokens in the leaky bucket. If there are enough tokens in the leaky bucket, the packet is allowed to pass, and a number of tokens corresponding to the length of the packet is taken away from the leaky bucket. If there are not enough tokens in the leaky bucket, the packet is discarded or marked.

It can be seen that although the packet traffic can be limited using RFC2697 and RFC2698, QoSs for packets with different priorities cannot be distinguished during the traffic-limitation, leading to low flexibility in an existing method for limiting the packet traffic, which is disadvantageous for improving QoS and user experience of a data network.

SUMMARY

In view of this, it is desired that an embodiment of the disclosure provides a method and device for traffic limitation by a leaky bucket, capable of flexible limitation of packet traffic according to weighted priorities, thus improving QoS and user experience of a data network.

To this end, a technical solution of the disclosure is implemented as follows.

A method for traffic limitation by a leaky bucket, includes that: during traffic-limitation of a group of packets sharing a same leaky bucket and having separate weighted priorities, the overall leaky bucket is divided into multiple sub-buckets according to priority parameters of the packets including a number of the weighted priorities and ratios between the weighted priorities, wherein the ratios depend on a requirement on jitter-absorption by traffics with the separate weighted priorities, a sum of volumes of the sub-buckets equals to a volume of the overall leaky bucket, and each of the sub-buckets corresponds to a weighted priority of the packets, the method includes that:

after packet information including at least lengths and the priority parameters of the packets is received, parameters relevant to traffic-limitation by a leaky bucket is acquired;

a total number of tokens to be added to the overall leaky bucket is calculated according to the acquired parameters relevant to traffic-limitation by a leaky bucket;

token-addition is performed on the sub-buckets according to the calculated total number of tokens and the weighted priorities corresponding to the sub-buckets; and a packet is forwarded, or discarded, or marked according to a length of the packet and a number of tokens in a sub-bucket corresponding to a weighted priority of the packet, wherein token-addition is performed on the overall leaky bucket and the sub-buckets according to the calculated total number of tokens and the weighted priorities corresponding to the sub-buckets firstly, by performing token-addition on the overall leaky bucket according to the calculated total number of tokens, wherein when the overall leaky bucket is overrun with tokens, a number of tokens in the overall leaky bucket equals the volume of the overall leaky bucket, otherwise when the overall leaky bucket is not overrun with tokens, the number of tokens in the overall leaky bucket is a total number after the token-addition; and secondly, when the overall leaky bucket is overrun with tokens, and therefore all the sub-buckets corresponding to the weighted priorities are overrun with tokens, otherwise when not all the sub-buckets corresponding to the weighted priorities are overrun with tokens, by dividing, according to the ratios between the weighted priorities, the total number of tokens to be added to the overall leaky bucket into numbers of tokens to be added to the sub-buckets corresponding to the weighted priorities; and by performing token-addition on the sub-buckets according to the numbers of tokens to be added to the sub-buckets corresponding to the weighted priorities, and after token-addition is performed on all the sub-buckets, when a sub-bucket is overrun with tokens, by allocating any overrunning token to another sub-bucket not overrun with tokens via mutual uptake of overrun.

The method may further include that: after a packet is forwarded, or discarded, or marked, the parameters relevant to traffic-limitation by a leaky bucket are updated, wherein the parameters relevant to traffic-limitation by a leaky bucket include a number of tokens in each sub-bucket after traffic-limitation.

The parameters relevant to traffic-limitation by a leaky bucket may include: the volume of the overall leaky bucket, the weighted priorities, a total rate of token-addition, the time of a last traffic-limitation, the number of tokens in the overall leaky bucket, and the number of tokens in each sub-bucket; and the parameters relevant to traffic-limitation by a leaky bucket may be updated by: updating the time of the last traffic-limitation to the current time, and updating the number of tokens in the overall leaky bucket and the number of tokens in each sub-bucket to the number of tokens in the overall leaky bucket and the number of tokens in each sub-bucket after traffic-limitation.

The parameters relevant to traffic-limitation by a leaky bucket may further include one or more of the following: the volume of each sub-bucket, ratios in sub-bucket-volume allocation, preset ratios directed at allocation via mutual uptake of overrun, and a preset number of token-additions via mutual uptake of overrun.

Any overrunning token may be allocated to another sub-bucket not overrun with tokens via mutual uptake of overrun by:

allocating any overrunning token to another sub-bucket not overrun with tokens according to the ratios between the weighted priorities or according to preset ratios; when token-overrun remains after this second round of token-addition, performing a third round of token-addition to another sub-bucket not overrun with tokens, . . . , until no sub-bucket is overrun with tokens, or a preset number of token-additions via mutual uptake of overrun is reached; and after the preset number of token-additions via mutual uptake of overrun is reached, discarding any sub-bucket-overrunning token, and reducing the number of tokens in the overall leaky bucket by a number corresponding to any discarded token.

A packet may be forwarded, or discarded, or marked according to a length of the packet and a number of tokens in a sub-bucket corresponding to a weighted priority of the packet by selecting the sub-bucket corresponding to the weighted priority of the packet; comparing the number of tokens in the sub-bucket with the length of the packet; when the number of tokens in the sub-bucket is no less than the length of the packet, forwarding the packet, and reducing both the number of tokens in the overall leaky bucket and the number of tokens in the sub-bucket by a number corresponding to the length of the packet; otherwise when the number of tokens in the sub-bucket is less than the length of the packet, discarding or marking the packet, wherein the number of tokens in the overall leaky bucket and the number of tokens in each sub-bucket remain the same.

A device for traffic limitation by a leaky bucket, includes an overall leaky bucket, a packet information receiving module, a token adding module, a parameter storing module, and a packet processing module, wherein the overall leaky bucket is divided into multiple sub-buckets according to priority parameters of packets including a number of weighted priorities of the packets and ratios between the weighted priorities, wherein each of the sub-buckets corresponds to a weighted priority of the packets;

the packet information receiving module is configured to receive packet information including at least lengths and the priority parameters of the packets;

the token adding module is configured to, after the packet information receiving module receives the packet information, acquire parameters relevant to traffic-limitation by a leaky bucket from the parameter storing module; calculate a total number of tokens to be added to the overall leaky bucket according to the acquired parameters relevant to traffic-limitation by a leaky bucket; and perform token-addition on the sub-buckets according to the calculated total number of tokens and the weighted priorities corresponding to the sub-buckets;

the parameter storing module is configured to maintain the parameters relevant to traffic-limitation by a leaky bucket; and the packet processing module is configured to forward, or discard, or mark a packet according to a length of the packet and a number of tokens in a sub-bucket corresponding to a weighted priority of the packet;

wherein the token adding module performs token-addition on the overall leaky bucket and the sub-buckets according to the calculated total number of tokens and the weighted priorities corresponding to the sub-buckets firstly by performing token-addition on the overall leaky bucket according to the calculated total number of tokens, wherein when the overall leaky bucket is overrun with tokens, a number of tokens in the overall leaky bucket equals the volume of the overall leaky bucket, otherwise when the overall leaky bucket is not overrun with tokens, the number of tokens in the overall leaky bucket is a total number after the token-addition; and secondly, when the overall leaky bucket is overrun with tokens, and therefore all the sub-buckets corresponding to the weighted priorities are overrun with tokens, otherwise when not all the sub-buckets corresponding to the weighted priorities are overrun with tokens, by dividing, according to the ratios between the weighted priorities, the total number of tokens to be added to the overall leaky bucket into numbers of tokens to be added to the sub-buckets corresponding to the weighted priorities; and by performing token-addition on the sub-buckets according to the numbers of tokens to be added to the sub-buckets corresponding to the weighted priorities, and after token-addition is performed on all the sub-buckets, by allocating any overrunning token to another sub-bucket not overrun with tokens via mutual uptake of overrun.

The parameter storing module may be further configured to, after the packet processing module forwards, or discards, or marks the packet, update the parameters relevant to traffic-limitation by a leaky bucket.

The parameters relevant to traffic-limitation by a leaky bucket stored by the parameter storing module may include: the volume of the overall leaky bucket, the weighted priorities, a total rate of token-addition, the time of a last traffic-limitation, the number of tokens in the overall leaky bucket, and the number of tokens in each sub-bucket; and the parameter storing module may update the parameters relevant to traffic-limitation by a leaky bucket by updating the time of the last traffic-limitation to the current time, and updating the number of tokens in the overall leaky bucket and the number of tokens in each sub-bucket to the number of tokens in the overall leaky bucket and the number of tokens in each sub-bucket after traffic-limitation.

The parameters relevant to traffic-limitation by a leaky bucket stored by the parameter storing module may further include one or more of the following: the volume of each sub-bucket, ratios in sub-bucket-volume allocation, preset ratios directed at allocation via mutual uptake of overrun, and a preset number of token-additions via mutual uptake of overrun.

The token adding module may allocate any overrunning token to another sub-bucket not overrun with tokens by: allocating any overrunning token to another sub-bucket not overrun with tokens according to the ratios between the weighted priorities or according to preset ratios; when token-overrun remains after this second round of token-addition, performing a third round of token-addition to another sub-bucket not overrun with tokens, . . . , until no sub-bucket is overrun with tokens, or a preset number of token-additions via mutual uptake of overrun is reached.

The packet processing module may forward, or discard, or mark the packet according to the length of the packet and the number of tokens in the sub-bucket corresponding to the weighted priority of the packet by selecting the sub-bucket corresponding to the weighted priority of the packet; comparing the number of tokens in the sub-bucket with the length of the packet; when the number of tokens in the sub-bucket is no less than the length of the packet, forwarding the packet, and reducing both the number of tokens in the overall leaky bucket and the number of tokens in the sub-bucket by a number corresponding to the length of the packet; otherwise when the number of tokens in the sub-bucket is less than the length of the packet, discarding or marking the packet, wherein the number of tokens in the overall leaky bucket and the number of tokens in each sub-bucket remain the same.

With the method and device for traffic limitation by a leaky bucket according to the disclosure, packets with separate weighted priorities are handled separately by dividing an overall leaky bucket into multiple sub-buckets according to a requirement on jitter-absorption by traffics with the separate weighted priorities, wherein each of the weighted priorities corresponds to one of the sub-buckets. During token-addition, a number of tokens to be added to a sub-bucket differs depending on a weighted priority corresponding to the sub-bucket, wherein generally, a number of tokens to be added to a sub-bucket corresponding to a high weighted priority is greater than a number of tokens to be added to a sub-bucket corresponding to a low weighted priority; during token-addition, when the number of tokens to be added to a sub-bucket corresponding to a certain weighted priority exceeds the volume of the sub-bucket, any overrunning token thereof may be shared with a sub-bucket corresponding to another weighted priority; subsequently, a received packet is forwarded, discarded, or marked according to the number of tokens in a sub-bucket corresponding to the weighted priority of the packet. The disclosure overcomes the disadvantage that difference in packet priorities cannot be reflected in traffic-limitation by a traditional leaky bucket, allowing packets with separate weighted priorities to have a fixed probability of passing or being discarded under the same traffic-limiting condition. In other words, in case of network congestion, a packet with a high weighted priority passes with a high probability while a packet with a low weighted priority is discarded with a high probability. Therefore, with the disclosure, it is possible to limit packet traffic flexibly according to weighted priorities and thereby improve QoS and user experience of a data network. In addition, in the case that the number of tokens to be added to a sub-bucket corresponding to a certain weighted priority exceeds the volume of the sub-bucket, any overrunning token thereof is shared with a sub-bucket corresponding to another weighted priority, thus implementing dynamic allocation of traffic-limiting bandwidths corresponding to weighted priorities and improving resource utilization. Moreover, the disclosure combines traffic-limitation of data packets with token scheduling, allowing dismiss of the design of scheduling hardware, thereby saving hardware resources of a network.

DETAILED DESCRIPTION

According to embodiments of the disclosure, for a group of packets with separate weighted priorities, each of the weighted priorities corresponds to one sub-bucket in an overall leaky bucket; when token-addition is performed, a number of tokens to be added to a sub-bucket differs depending on a weighted priority corresponding to the sub-bucket, wherein generally, a number of tokens to be added to a sub-bucket corresponding to a high weighted priority is greater than a number of tokens to be added to a sub-bucket corresponding to a low weighted priority; during token-addition, when the number of tokens to be added to a sub-bucket corresponding to a certain weighted priority exceeds the volume of the sub-bucket, any overrunning token thereof may be shared with a sub-bucket corresponding to another weighted priority; subsequently, a received packet is forwarded, discarded, or marked according to the number of tokens in a sub-bucket corresponding to the weighted priority of the packet.

In the disclosure, packets subjected to traffic-limitation by a leaky bucket may be divided according to at least two weighted priorities (e.g. according to packet types). Accordingly, the volume of a leaky bucket is divided and allocated to at least two sub-buckets according to separate weighted priorities. The weighted priorities of the packets correspond to the sub-buckets.

Note that the volume of each sub-bucket may be allocated according to the ratios between the weighted priorities (e.g. of w1, w2, w3, . . . , wn, respectively), or may be allocated as needed. Generally, a sub-bucket corresponding to a high weighted priority is large in volume while a sub-bucket corresponding to a low weighted priority is small in volume. The sum of the volumes of all the sub-buckets equals to the volume of the overall leaky bucket, that is, denoting the volume of the overall leaky bucket as BS (bucket size) and the volumes of the sub-buckets respectively as BS1, BS2, BS3, . . . , BSn, then the volumes satisfy: BS=BS1+BS2+BS3+ . . . +BSn.

Figure 1:
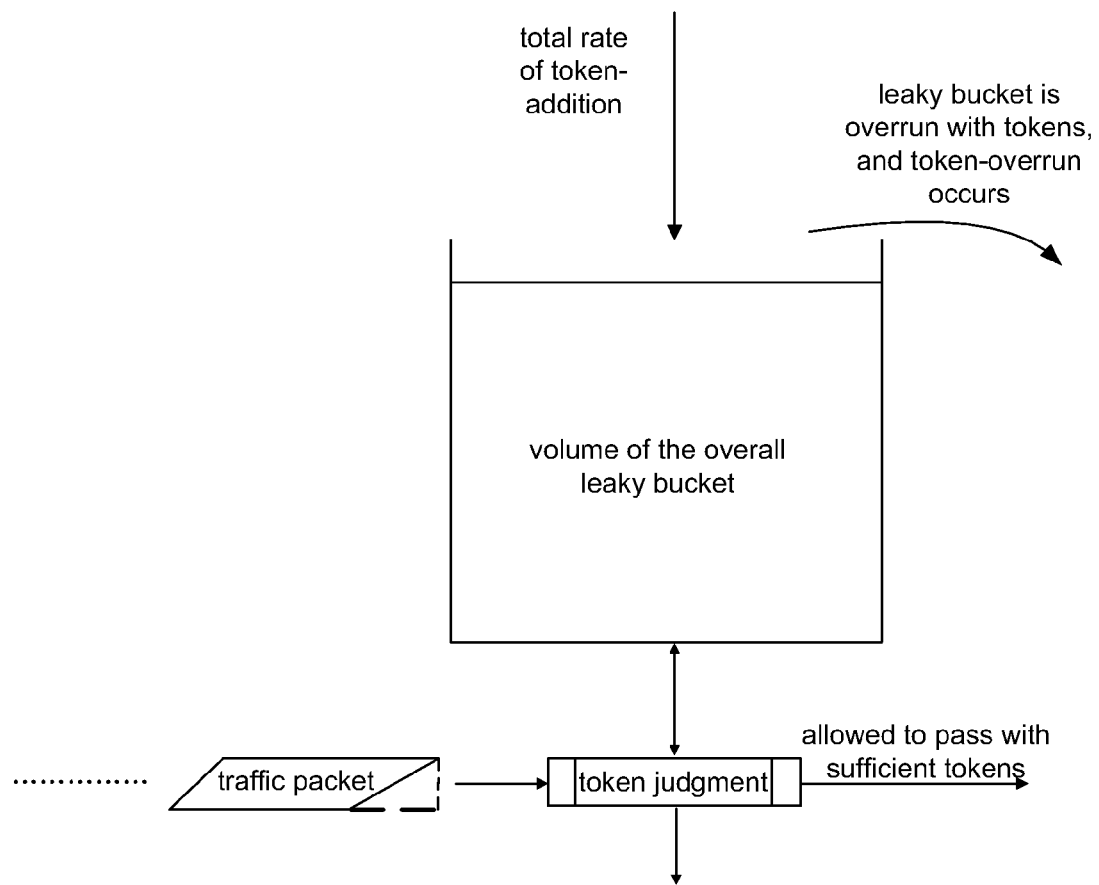
FIG. 1 is a schematic diagram illustrating the principle of traffic limitation by a leaky bucket in an existing RFC standard.
Figure 2:
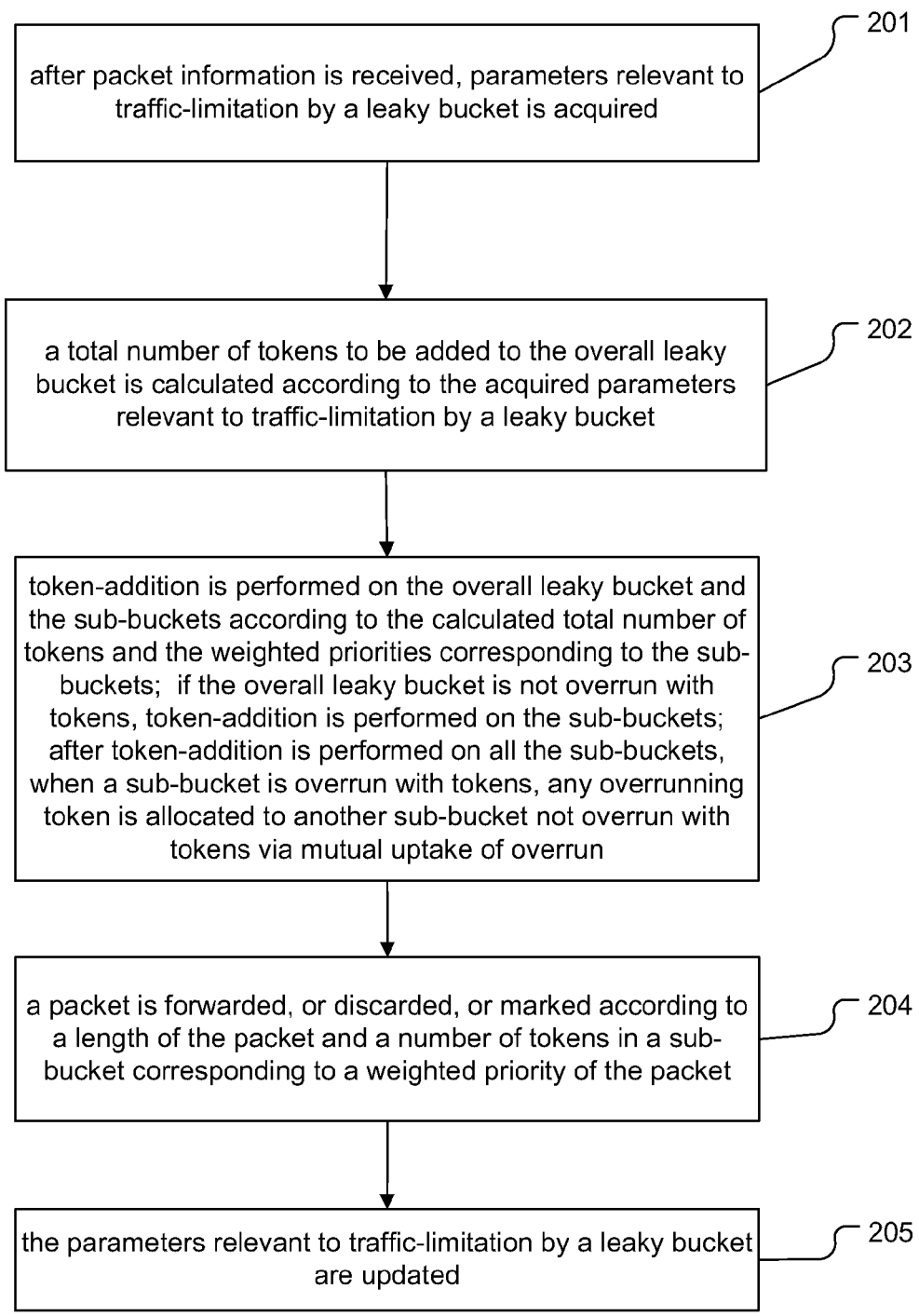
FIG. 2 is a flowchart of a method for traffic limitation by a leaky bucket according to the disclosure.

FIG. 2 is a flowchart of a method for traffic limitation by a leaky bucket according to the disclosure. As shown, the method includes the steps as follows.

Step 201: after packet information is received, parameters relevant to traffic-limitation by a leaky bucket is acquired.

Here, the packet information includes at least the lengths and priority parameters of packets; the parameters relevant to traffic-limitation by a leaky bucket may include, but are not limited to:

(1) the volume of an overall leaky bucket;
(2) weighted priorities;
(3) a total rate of token-addition;
(4) the time of last traffic-limitation;
(5) the number of tokens in the overall leaky bucket and in each sub-bucket, i.e., the number of tokens after the last traffic-limitation of the same group of packets when traffic-limitation is performed last time;

if sub-bucket-volume allocation is performed according to the weighted priorities, the volume of each sub-bucket may be further acquired according to the volume of the overall leaky bucket and the weighted priorities; if sub-bucket-volume allocation is performed as needed, the parameters relevant to traffic-limitation by a leaky bucket further need to include the volume of each sub-bucket or ratios in sub-bucket-volume allocation; the volume of each sub-bucket may be acquired according to the volume of the overall leaky bucket and the ratios in sub-bucket-volume allocation; nevertheless, the volume of each sub-bucket should meet a requirement on jitter-absorption by traffics with the separate weighted priorities; in addition, the parameters relevant to traffic-limitation by a leaky bucket may further include preset ratios directed at allocation via mutual uptake of overrun and/or a preset number of token-additions via mutual uptake of overrun; in a practical application, the aforementioned parametrical configuration has to be maintained for implementation via either hardware or software;

Step 202: a total number of tokens to be added to the overall leaky bucket is calculated according to the acquired parameters relevant to traffic-limitation by a leaky bucket.

Specifically, a time difference between the time of the current traffic-limitation and the time of the last traffic-limitation is calculated, and then a product of the time difference and the total rate of token-addition is calculated to obtain the total number of tokens to be added;

Step 203: token-addition is performed on the overall leaky bucket and the sub-buckets according to the calculated total number of tokens and the weighted priorities corresponding to the sub-buckets.

Specifically, firstly, token-addition is performed on the overall leaky bucket according to the calculated total number of tokens, wherein when the overall leaky bucket is overrun with tokens, a number of tokens in the overall leaky bucket equals the volume of the overall leaky bucket, otherwise when the overall leaky bucket is not overrun with tokens, the number of tokens in the overall leaky bucket is a total number after the token-addition; and secondly, when the overall leaky bucket is overrun with tokens, all the sub-buckets corresponding to the weighted priorities are therefore overrun with tokens, otherwise when not all the sub-buckets corresponding to the weighted priorities are overrun with tokens, the total number of tokens to be added to the overall leaky bucket is divided into numbers of tokens to be added to the sub-buckets corresponding to the weighted priorities according to the ratios between the weighted priorities; and token-addition is performed on the sub-buckets according to the numbers of tokens to be added to the sub-buckets corresponding to the weighted priorities, and when a sub-bucket is overrun with tokens, mutual uptake of overrun among the sub-buckets has to be performed so as to obtain the current numbers of tokens in the sub-buckets corresponding to all weighted priorities.

For example, if the total number of tokens to be added is acquired through the numbers of tokens to be added to the sub-buckets strictly according to the ratios between the weighted priorities (w1, w2, w3, ..., wn), the total number of tokens to be is denoted by delta_token, and the numbers of tokens to be added to the sub-buckets are denoted respectively by delta_token1, delta_token2, delta_token3, ..., delta_tokenn, then the numbers of tokens satisfy:

delta_token1 = delta_token * w1;

delta_token2 = delta_token * w2;

delta_token3 = delta_token * w3;

⋮ delta_tokenn = delta_token * wn;

delta_token = delta_token1 + delta_token2 + ... + delta_tokenn.

The mutual uptake of overrun is performed as follows: during token-addition, if a sub-bucket is overrun with tokens, the number of tokens in the sub-bucket is the volume of the sub-bucket; after token-addition is performed on all the sub-buckets, if a certain sub-bucket or some sub-buckets are overrun with tokens, but the number of tokens provided for being added to the sub-bucket or sub-buckets overrun with tokens exceeds the volume thereof, any overrunning token may be allocated to another sub-bucket not overrun with tokens according to the ratios between the weighted priorities or preset ratios directed at allocation via mutual uptake of overrun; if the another sub-bucket not overrun with tokens becomes overrun with tokens after the second round of token-addition, the number of tokens in the another sub-bucket is the volume of the another sub-bucket; when token-overrun remains after this second round of token-addition, a third round of token-addition is performed on another sub-bucket not overrun with tokens, . . . , until no sub-bucket is overrun with tokens, or a preset number of token-additions (also known as iterations) via mutual uptake of overrun is reached, such that the number of tokens in each sub-bucket is obtained.

Note that if the number of the sub-buckets is N, the maximal number of number of iterations of mutual uptake of any sub-bucket-overrunning token is N−1, and if the preset number of token-additions via mutual uptake of overrun is reached, any remaining sub-bucket-overrunning token will be discarded, and the number of tokens in the overall leaky bucket is reduced by a number corresponding to any discarded token;

Step 204: a packet is forwarded, or discarded, or marked according to a length of the packet and a number of tokens in a sub-bucket corresponding to a weighted priority of the packet.

Specifically, the sub-bucket corresponding to the weighted priority of the packet is selected; then the number of tokens in the sub-bucket is compared with the length of the packet to determine whether or not to forward the packet; when the number of tokens in the sub-bucket is no less than the length of the packet, the packet is forwarded, and both the number of tokens in the overall leaky bucket and the number of tokens in the sub-bucket are reduced by a number corresponding to the length of the packet; otherwise when the number of tokens in the sub-bucket is less than the length of the packet, the packet is discarded or marked, wherein the number of tokens in the overall leaky bucket and the number of tokens in each sub-bucket remain the same.

Figure 3:
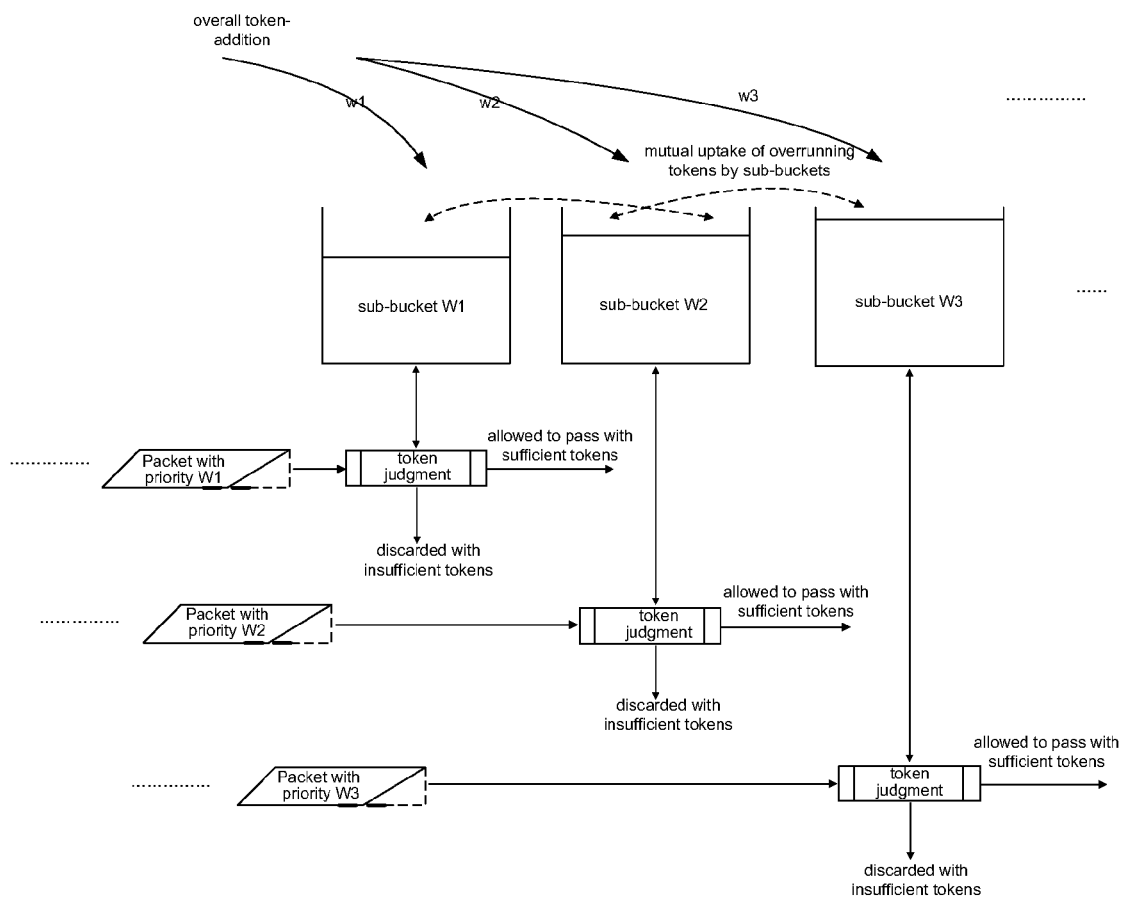
FIG. 3 is a schematic diagram illustrating the principle of traffic limitation by a leaky bucket relevant to the disclosure.

FIG. 3 shows the principle of traffic limitation by a leaky bucket relevant to the disclosure. It can be seen that with the disclosure, during limitation of traffics with separate weighted priorities by a leaky bucket, it is possible to allocate any overrunning token dynamically between sub-buckets, thereby implementing dynamic allocation of traffic-limiting bandwidths corresponding to weighted priorities, improving utilization of the traffic-limiting bandwidths and network QoS;

Step 205: the parameters relevant to traffic-limitation by a leaky bucket are updated.

Here, updating in Step 205 mainly refers to that the time of the last traffic-limitation is updated to the current time, and the number of tokens in the overall leaky bucket and the number of tokens in each sub-bucket are updated to those numbers after traffic-limitation.

Figure 4:
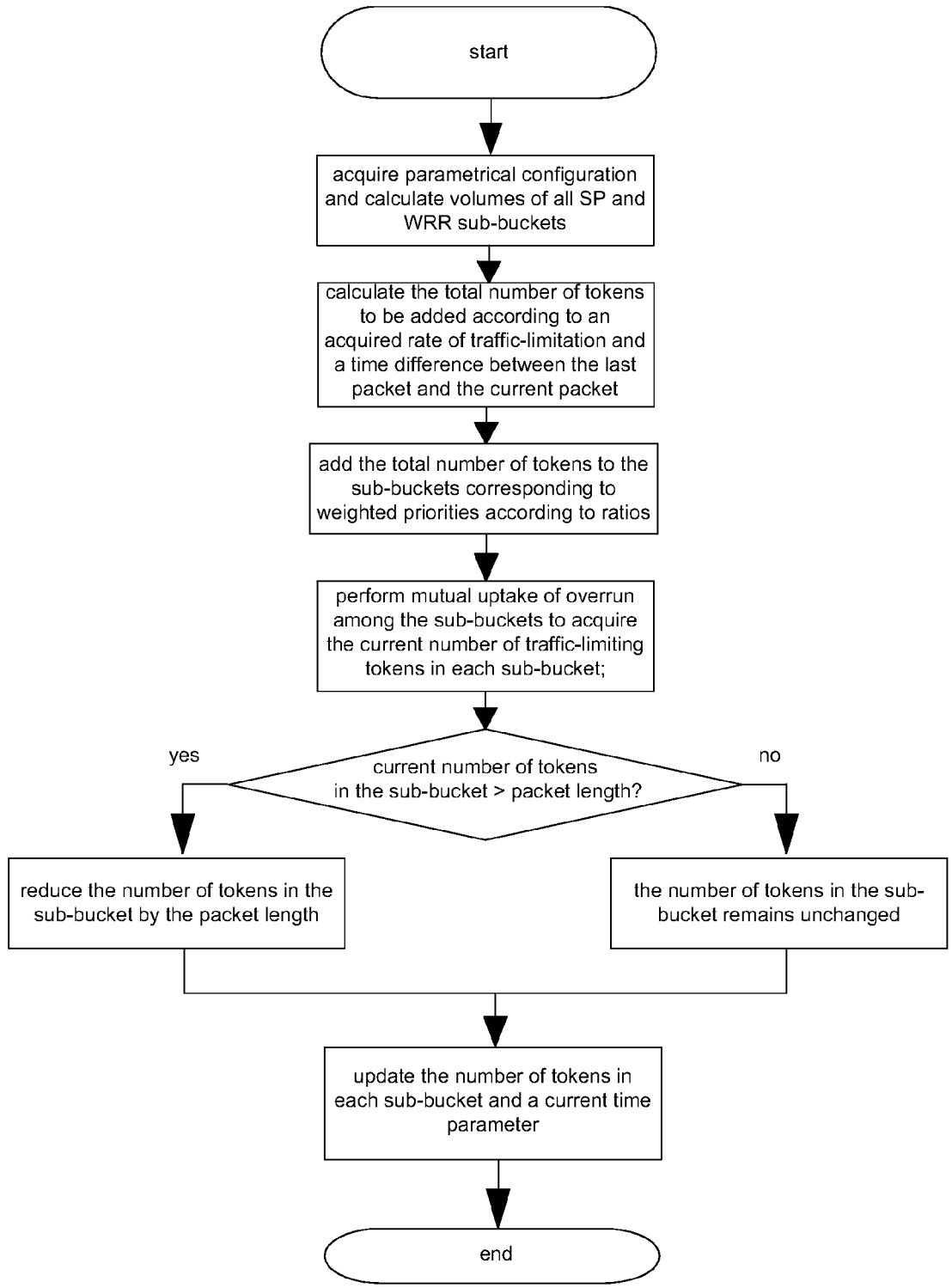
FIG. 4 is a detailed flowchart of a method for traffic limitation by a leaky bucket according to the disclosure.

Note that if the disclosure is implemented by hardware, logic and parameter storage resources for traffic-limitation calculation will increase linearly with the number of the sub-buckets, and comprehensive evaluation needs to be performed according to a practical demand. FIG. 4 shows a detailed flow of a method for traffic limitation by a leaky bucket according to the disclosure.

Accordingly, the disclosure further provides a device for traffic limitation by a leaky bucket, including an overall leaky bucket, a packet information receiving module, a token adding module, a parameter storing module, and a packet processing module, wherein the overall leaky bucket is divided into multiple sub-buckets according to priority parameters of packets including a number of weighted priorities of the packets and ratios between the weighted priorities, wherein each of the sub-buckets corresponds to a weighted priority of the packets;

the packet information receiving module is configured to receive packet information including at least lengths and the priority parameters of the packets;

the token adding module is configured to, after the packet information receiving module receives the packet information, acquire parameters relevant to traffic-limitation by a leaky bucket from the parameter storing module; calculate a total number of tokens to be added to the overall leaky bucket according to the acquired parameters relevant to traffic-limitation by a leaky bucket; and perform token-addition on the sub-buckets according to the calculated total number of tokens and the weighted priorities corresponding to the sub-buckets;

the parameter storing module is configured to maintain the parameters relevant to traffic-limitation by a leaky bucket; and the packet processing module is configured to forward, or discard, or mark a packet according to a length of the packet and a number of tokens in a sub-bucket corresponding to a weighted priority of the packet, wherein the token adding module performs token-addition on the overall leaky bucket and the sub-buckets according to the calculated total number of tokens and the weighted priorities corresponding to the sub-buckets firstly by performing token-addition on the overall leaky bucket according to the calculated total number of tokens, wherein when the overall leaky bucket is overrun with tokens, a number of tokens in the overall leaky bucket equals the volume of the overall leaky bucket, otherwise when the overall leaky bucket is not overrun with tokens, the number of tokens in the overall leaky bucket is a total number after the token-addition; and secondly, when the overall leaky bucket is overrun with tokens, and therefore all the sub-buckets corresponding to the weighted priorities are overrun with tokens, otherwise when not all the sub-buckets corresponding to the weighted priorities are overrun with tokens, by dividing, according to the ratios between the weighted priorities, the total number of tokens to be added to the overall leaky bucket into numbers of tokens to be added to the sub-buckets corresponding to the weighted priorities; and by performing token-addition on the sub-buckets according to the numbers of tokens to be added to the sub-buckets corresponding to the weighted priorities, and after token-addition is performed on all the sub-buckets, by allocating any overrunning token to another sub-bucket not overrun with tokens via mutual uptake of overrun.

The parameter storing module is further configured to, after the packet processing module forwards, or discards, or marks the packet, update the parameters relevant to traffic-limitation by a leaky bucket.

The parameters relevant to traffic-limitation by a leaky bucket stored by the parameter storing module includes: the volume of the overall leaky bucket, the weighted priorities, a total rate of token-addition, the time of a last traffic-limitation, the number of tokens in the overall leaky bucket, and the number of tokens in each sub-bucket; and the parameter storing module updates the parameters relevant to traffic-limitation by a leaky bucket by updating the time of the last traffic-limitation to the current time, and updating the number of tokens in the overall leaky bucket and the number of tokens in each sub-bucket to those after traffic-limitation.

The parameters relevant to traffic-limitation by a leaky bucket stored by the parameter storing module further include one or more of the following: the volume of each sub-bucket, ratios in sub-bucket-volume allocation, preset ratios directed at allocation via mutual uptake of overrun, and a preset number of token-additions via mutual uptake of overrun.

The token adding module allocates any overrunning token to another sub-bucket not overrun with tokens by: allocating any overrunning token to another sub-bucket not overrun with tokens according to the ratios between the weighted priorities or according to preset ratios; when token-overrun remains after this second round of token-addition, performing a third round of token-addition to another sub-bucket not overrun with tokens, . . . , until no sub-bucket is overrun with tokens, or a preset number of token-additions via mutual uptake of overrun is reached.

The packet processing module forwards, or discards, or marks the received packet according to the length of the packet and the number of tokens in the sub-bucket corresponding to the weighted priority of the packet by selecting the sub-bucket corresponding to the weighted priority of the packet; comparing the number of tokens in the sub-bucket with the length of the packet; when the number of tokens in the sub-bucket is no less than the length of the packet, forwarding the packet, and reducing both the number of tokens in the overall leaky bucket and the number of tokens in the sub-bucket by a number corresponding to the length of the packet; otherwise when the number of tokens in the sub-bucket is less than the length of the packet, discarding or marking the packet, wherein the number of tokens in the overall leaky bucket and the number of tokens in each sub-bucket remain the same.

With the disclosure, token-addition is performed on sub-buckets corresponding to separate weighted priorities according to ratios between the weighted priorities, such that packets with the weighted priorities may pass substantially according to the ratios between the weighted priorities. At the same time, with addition of mutual uptake of any sub-bucket-overrunning token in the disclosure, it is possible to allocate any token overrunning a sub-bucket to another sub-bucket, thus avoiding waste of traffic-limiting bandwidths.

The above are only preferred embodiments of the disclosure and should not be used for limiting the protection scope of the disclosure.

The invention claimed is:

1. A method for traffic limitation by a leaky bucket, comprising: during traffic-limitation of a group of packets sharing a same leaky bucket and having separate weighted priorities, dividing the overall leaky bucket into multiple sub-buckets according to priority parameters of the packets comprising a number of the weighted priorities and ratios between the weighted priorities, wherein the ratios depend on a requirement on jitter-absorption by traffics with the separate weighted priorities, a sum of volumes of the sub-buckets equals to a volume of the overall leaky bucket, and each of the sub-buckets corresponds to a weighted priority of the packets, the method comprising:

after packet information comprising at least lengths and the priority parameters of the packets is received, acquiring parameters relevant to traffic-limitation by a leaky bucket;

calculating a total number of tokens to be added to the overall leaky bucket according to the acquired parameters relevant to traffic-limitation by a leaky bucket;

performing token-addition on the sub-buckets according to the calculated total number of tokens and the weighted priorities corresponding to the sub-buckets; and forwarding, or discarding, or marking a packet according to a length of the packet and a number of tokens in a sub-bucket corresponding to a weighted priority of the packet, wherein performing token-addition on the overall leaky bucket and the sub-buckets according to the calculated total number of tokens and the weighted priorities corresponding to the sub-buckets comprises:

firstly, performing token-addition on the overall leaky bucket according to the calculated total number of tokens, wherein when the overall leaky bucket is overrun with tokens, a number of tokens in the overall leaky bucket equals the volume of the overall leaky bucket, otherwise when the overall leaky bucket is not overrun with tokens, the number of tokens in the overall leaky bucket is a total number after the token-addition; and secondly, when the overall leaky bucket is overrun with tokens, and therefore all the sub-buckets corresponding to the weighted priorities are overrun with tokens, otherwise when not all the sub-buckets corresponding to the weighted priorities are overrun with tokens, dividing, according to the ratios between the weighted priorities, the total number of tokens to be added to the overall leaky bucket into numbers of tokens to be added to the sub-buckets corresponding to the weighted priorities; and performing token-addition on the sub-buckets according to the numbers of tokens to be added to the sub-buckets corresponding to the weighted priorities, and after token-addition is performed on all the sub-buckets, when a sub-bucket is overrun with tokens, allocating any overrunning token to another sub-bucket not overrun with tokens via mutual uptake of overrun.

2. The method according to claim 1, further comprising: after the forwarding, or discarding, or marking a packet, updating the parameters relevant to traffic-limitation by a leaky bucket, wherein the parameters relevant to traffic-limitation by a leaky bucket comprises a number of tokens in each sub-bucket after traffic-limitation.

3. The method according to claim 2, wherein
the parameters relevant to traffic-limitation by a leaky bucket comprises: the volume of the overall leaky bucket, the weighted priorities, a total rate of token-addition, the time of a last traffic-limitation, the number of tokens in the overall leaky bucket, and the number of tokens in each sub-bucket; and the updating the parameters relevant to traffic-limitation by a leaky bucket comprises: updating the time of the last traffic-limitation to the current time, and updating the number of tokens in the overall leaky bucket and the number of tokens in each sub-bucket to the number of tokens in the overall leaky bucket and the number of tokens in each sub-bucket after traffic-limitation.

4. The method according to claim 3, wherein the parameters relevant to traffic-limitation by a leaky bucket further comprise one or more of the following: the volume of each sub-bucket, ratios in sub-bucket-volume allocation, preset ratios directed at allocation via mutual uptake of overrun, and a preset number of token-additions via mutual uptake of overrun.

5. The method according to claim 4, wherein the allocating any overrunning token to another sub-bucket not overrun with tokens via mutual uptake of overrun comprises:

allocating any overrunning token to another sub-bucket not overrun with tokens according to the ratios between the weighted priorities or according to preset ratios; when token-overrun remains after this second round of token-addition, performing a third round of token-addition to another sub-bucket not overrun with tokens, until no sub-bucket is overrun with tokens, or a preset number of token-additions via mutual uptake of overrun is reached; and after the preset number of token-additions via mutual uptake of overrun is reached, discarding any sub-bucket-overrunning token, and reducing the number of tokens in the overall leaky bucket by a number corresponding to any discarded token.

6. The method according to claim 5, wherein the forwarding, or discarding, or marking a packet according to a length of the packet and a number of tokens in a sub-bucket corresponding to a weighted priority of the packet comprises:

selecting the sub-bucket corresponding to the weighted priority of the packet; comparing the number of tokens in the sub-bucket with the length of the packet; when the number of tokens in the sub-bucket is no less than the length of the packet, forwarding the packet, and reducing both the number of tokens in the overall leaky bucket and the number of tokens in the sub-bucket by a number corresponding to the length of the packet; otherwise when the number of tokens in the sub-bucket is less than the length of the packet, discarding or marking the packet, wherein the number of tokens in the overall leaky bucket and the number of tokens in each sub-bucket remain the same.

7. The method according to claim 2, wherein the allocating any overrunning token to another sub-bucket not overrun with tokens via mutual uptake of overrun comprises:

allocating any overrunning token to another sub-bucket not overrun with tokens according to the ratios between the weighted priorities or according to preset ratios; when token-overrun remains after this second round of token-addition, performing a third round of token-addition to another sub-bucket not overrun with tokens, until no sub-bucket is overrun with tokens, or a preset number of token-additions via mutual uptake of overrun is reached; and after the preset number of token-additions via mutual uptake of overrun is reached, discarding any sub-bucket-overrunning token, and reducing the number of tokens in the overall leaky bucket by a number corresponding to any discarded token.

8. The method according to claim 7, wherein the forwarding, or discarding, or marking a packet according to a length of the packet and a number of tokens in a sub-bucket corresponding to a weighted priority of the packet comprises:

selecting the sub-bucket corresponding to the weighted priority of the packet; comparing the number of tokens in the sub-bucket with the length of the packet; when the number of tokens in the sub-bucket is no less than the length of the packet, forwarding the packet, and reducing both the number of tokens in the overall leaky bucket and the number of tokens in the sub-bucket by a number corresponding to the length of the packet; otherwise when the number of tokens in the sub-bucket is less than the length of the packet, discarding or marking the packet, wherein the number of tokens in the overall leaky bucket and the number of tokens in each sub-bucket remain the same.

9. The method according to claim 3, wherein the allocating any overrunning token to another sub-bucket not overrun with tokens via mutual uptake of overrun comprises:

allocating any overrunning token to another sub-bucket not overrun with tokens according to the ratios between the weighted priorities or according to preset ratios; when token-overrun remains after this second round of token-addition, performing a third round of token-addition to another sub-bucket not overrun with tokens, until no sub-bucket is overrun with tokens, or a preset number of token-additions via mutual uptake of overrun is reached; and after the preset number of token-additions via mutual uptake of overrun is reached, discarding any sub-bucket-overrunning token, and reducing the number of tokens in the overall leaky bucket by a number corresponding to any discarded token.

10. The method according to claim 9, wherein the forwarding, or discarding, or marking a packet according to a length of the packet and a number of tokens in a sub-bucket corresponding to a weighted priority of the packet comprises:
selecting the sub-bucket corresponding to the weighted priority of the packet; comparing the number of tokens in the sub-bucket with the length of the packet; when the number of tokens in the sub-bucket is no less than the length of the packet, forwarding the packet, and reducing both the number of tokens in the overall leaky bucket and the number of tokens in the sub-bucket by a number corresponding to the length of the packet; otherwise when the number of tokens in the sub-bucket is less than the length of the packet, discarding or marking the packet, wherein the number of tokens in the overall leaky bucket and the number of tokens in each sub-bucket remain the same.

11. The method according to claim 1, wherein the allocating any overrunning token to another sub-bucket not overrun with tokens via mutual uptake of overrun comprises:
allocating any overrunning token to another sub-bucket not overrun with tokens according to the ratios between the weighted priorities or according to preset ratios; when token-overrun remains after this second round of token-addition, performing a third round of token-addition to another sub-bucket not overrun with tokens, until no sub-bucket is overrun with tokens, or a preset number of token-additions via mutual uptake of overrun is reached; and after the preset number of token-additions via mutual uptake of overrun is reached, discarding any sub-bucket-overrunning token, and reducing the number of tokens in the overall leaky bucket by a number corresponding to any discarded token.

12. The method according to claim 11, wherein the forwarding, or discarding, or marking a packet according to a length of the packet and a number of tokens in a sub-bucket corresponding to a weighted priority of the packet comprises:
selecting the sub-bucket corresponding to the weighted priority of the packet; comparing the number of tokens in the sub-bucket with the length of the packet; when the number of tokens in the sub-bucket is no less than the length of the packet, forwarding the packet, and reducing both the number of tokens in the overall leaky bucket and the number of tokens in the sub-bucket by a number corresponding to the length of the packet; otherwise when the number of tokens in the sub-bucket is less than the length of the packet, discarding or marking the packet, wherein the number of tokens in the overall leaky bucket and the number of tokens in each sub-bucket remain the same.

13. A device for traffic limitation by a leaky bucket, comprising an overall leaky bucket, a packet information receiving module, a token adding module, a parameter storing module, and a packet processing module, wherein
the overall leaky bucket is divided into multiple sub-buckets according to priority parameters of packets comprising a number of weighted priorities of the packets and ratios between the weighted priorities, wherein each of the sub-buckets corresponds to a weighted priority of the packets;
the packet information receiving module is configured to receive packet information comprising at least lengths and the priority parameters of the packets;
the token adding module is configured to, after the packet information receiving module receives the packet information, acquire parameters relevant to traffic-limitation by a leaky bucket from the parameter storing module; calculate a total number of tokens to be added to the overall leaky bucket according to the acquired parameters relevant to traffic-limitation by a leaky bucket; and perform token-addition on the sub-buckets according to the calculated total number of tokens and the weighted priorities corresponding to the sub-buckets;
the parameter storing module is configured to maintain the parameters relevant to traffic-limitation by a leaky bucket; and
the packet processing module is configured to forward, or discard, or mark a packet according to a length of the packet and a number of tokens in a sub-bucket corresponding to a weighted priority of the packet;
wherein the token adding module performs token-addition on the overall leaky bucket and the sub-buckets according to the calculated total number of tokens and the weighted priorities corresponding to the sub-buckets
firstly by performing token-addition on the overall leaky bucket according to the calculated total number of tokens, wherein when the overall leaky bucket is overrun with tokens, a number of tokens in the overall leaky bucket equals the volume of the overall leaky bucket, otherwise when the overall leaky bucket is not overrun with tokens, the number of tokens in the overall leaky bucket is a total number after the token-addition; and secondly, when the overall leaky bucket is overrun with tokens, and therefore all the sub-buckets corresponding to the weighted priorities are overrun with tokens, otherwise when not all the sub-buckets corresponding to the weighted priorities are overrun with tokens, by dividing, according to the ratios between the weighted priorities, the total number of tokens to be added to the overall leaky bucket into numbers of tokens to be added to the sub-buckets corresponding to the weighted priorities; and
by performing token-addition on the sub-buckets according to the numbers of tokens to be added to the sub-buckets corresponding to the weighted priorities, and after token-addition is performed on all the sub-buckets, by allocating any overrunning token to another sub-bucket not overrun with tokens via mutual uptake of overrun.

14. The device according to claim 13, wherein
the parameter storing module is further configured to, after the packet processing module forwards, or discards, or marks the packet, update the parameters relevant to traffic-limitation by a leaky bucket.

15. The device according to claim 14 wherein
the parameters relevant to traffic-limitation by a leaky bucket stored by the parameter storing module comprises: the volume of the overall leaky bucket, the weighted priorities, a total rate of token-addition, the time of a last traffic-limitation, the number of tokens in the overall leaky bucket, and the number of tokens in each sub-bucket; and
the parameter storing module updates the parameters relevant to traffic-limitation by a leaky bucket by updating the time of the last traffic-limitation to the current time, and updating the number of tokens in the overall leaky bucket and the number of tokens in each sub-bucket to the number of tokens in the overall leaky bucket and the number of tokens in each sub-bucket after traffic-limitation.

16. The device according to claim 15, wherein the parameters relevant to traffic-limitation by a leaky bucket stored by the parameter storing module further comprise one or more of the following: the volume of each sub-bucket, ratios in sub-bucket-volume allocation, preset ratios directed at allocation via mutual uptake of overrun, and a preset number of token-additions via mutual uptake of overrun.

17. The device according to claim 14, wherein
the token adding module allocates any overrunning token to another sub-bucket not overrun with tokens by: allocating any overrunning token to another sub-bucket not overrun with tokens according to the ratios between the weighted priorities or according to preset ratios; when token-overrun remains after this second round of token-addition, performing a third round of token-addition to another sub-bucket not overrun with tokens, until no sub-bucket is overrun with tokens, or a preset number of token-additions via mutual uptake of overrun is reached.

18. The device according to claim 17, wherein
the packet processing module forwards, or discards, or marks the packet according to the length of the packet and the number of tokens in the sub-bucket corresponding to the weighted priority of the packet by
selecting the sub-bucket corresponding to the weighted priority of the packet; comparing the number of tokens in the sub-bucket with the length of the packet; when the number of tokens in the sub-bucket is no less than the length of the packet, forwarding the packet, and reducing both the number of tokens in the overall leaky bucket and the number of tokens in the sub-bucket by a number corresponding to the length of the packet; otherwise when the number of tokens in the sub-bucket is less than the length of the packet, discarding or marking the packet, wherein the number of tokens in the overall leaky bucket and the number of tokens in each sub-bucket remain the same.

19. The device according to claim 15, wherein
the token adding module allocates any overrunning token to another sub-bucket not overrun with tokens by: allocating any overrunning token to another sub-bucket not overrun with tokens according to the ratios between the weighted priorities or according to preset ratios; when token-overrun remains after this second round of token-addition, performing a third round of token-addition to another sub-bucket not overrun with tokens, until no sub-bucket is overrun with tokens, or a preset number of token-additions via mutual uptake of overrun is reached.

20. The device according to claim 19, wherein
the packet processing module forwards, or discards, or marks the packet according to the length of the packet and the number of tokens in the sub-bucket corresponding to the weighted priority of the packet by
selecting the sub-bucket corresponding to the weighted priority of the packet; comparing the number of tokens in the sub-bucket with the length of the packet; when the number of tokens in the sub-bucket is no less than the length of the packet, forwarding the packet, and reducing both the number of tokens in the overall leaky bucket and the number of tokens in the sub-bucket by a number corresponding to the length of the packet; otherwise when the number of tokens in the sub-bucket is less than the length of the packet, discarding or marking the packet, wherein the number of tokens in the overall leaky bucket and the number of tokens in each sub-bucket remain the same.

21. The device according to claim 13, wherein
the token adding module allocates any overrunning token to another sub-bucket not overrun with tokens by: allocating any overrunning token to another sub-bucket not overrun with tokens according to the ratios between the weighted priorities or according to preset ratios; when token-overrun remains after this second round of token-addition, performing a third round of token-addition to another sub-bucket not overrun with tokens, until no sub-bucket is overrun with tokens, or a preset number of token-additions via mutual uptake of overrun is reached.

22. The device according to claim 21, wherein
the packet processing module forwards, or discards, or marks the packet according to the length of the packet and the number of tokens in the sub-bucket corresponding to the weighted priority of the packet by
selecting the sub-bucket corresponding to the weighted priority of the packet; comparing the number of tokens in the sub-bucket with the length of the packet; when the number of tokens in the sub-bucket is no less than the length of the packet, forwarding the packet, and reducing both the number of tokens in the overall leaky bucket and the number of tokens in the sub-bucket by a number corresponding to the length of the packet; otherwise when the number of tokens in the sub-bucket is less than the length of the packet, discarding or marking the packet, wherein the number of tokens in the overall leaky bucket and the number of tokens in each sub-bucket remain the same.

* * * * *